(12) United States Patent
Mizuyoshi

(10) Patent No.: US 7,360,938 B2
(45) Date of Patent: Apr. 22, 2008

(54) SURFACE LIGHT-SOURCE DEVICE AND DISPLAY UNIT USING THE SAME

(75) Inventor: Akira Mizuyoshi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 23 days.

(21) Appl. No.: 11/543,125

(22) Filed: Oct. 5, 2006

(65) Prior Publication Data
US 2007/0076425 A1 Apr. 5, 2007

(30) Foreign Application Priority Data
Oct. 5, 2005 (JP) .............................. 2005-292044

(51) Int. Cl.
  F21V 7/04 (2006.01)
  F21V 5/00 (2006.01)
  G09F 13/04 (2006.01)
  F21S 4/00 (2006.01)
(52) U.S. Cl. .............. 362/616; 362/607; 362/608; 362/97; 362/224; 362/245
(58) Field of Classification Search ................ 362/616, 362/608, 607, 97, 245, 224
See application file for complete search history.

(56) References Cited

U.S. PATENT DOCUMENTS

| | | | | |
|---|---|---|---|---|
| 5,089,944 A | * | 2/1992 | Oe et al. ................... | 362/224 |
| 6,561,663 B2 | * | 5/2003 | Adachi et al. ............. | 362/616 |
| 6,802,628 B2 | * | 10/2004 | Kuo .......................... | 362/332 |
| 6,811,282 B1 | * | 11/2004 | Kuo .......................... | 362/241 |
| 7,090,365 B2 | * | 8/2006 | Ogawa et al. ............... | 362/29 |
| 7,106,394 B2 | * | 9/2006 | Ono et al. .................... | 349/62 |

FOREIGN PATENT DOCUMENTS

JP  6-100886 B2  12/1994

* cited by examiner

*Primary Examiner*—Jong-Suk (James) Lee
*Assistant Examiner*—David J Makiya
(74) *Attorney, Agent, or Firm*—Sughrue Mion, PLLC

(57) ABSTRACT

A surface light-source device of a display unit comprises a light source, light guide plates and reflector sheets. The light guide plate has an emission surface for emitting the light of the light source as planar light. The reflector sheet reflects the light of the light source, which has entered the light guide plate, toward the emission surface. At rear surfaces of the light guide plates, grooves and incline surfaces are formed. The grooves contain the light source. The incline surfaces have a V-shaped section and reflect the light of the light source, which has entered the light guide plate, toward the emission surface. The light guide plates are disposed such that the rear surfaces thereof closely confront each other so as to interpose the light source between the grooves.

12 Claims, 4 Drawing Sheets

FIG. 5
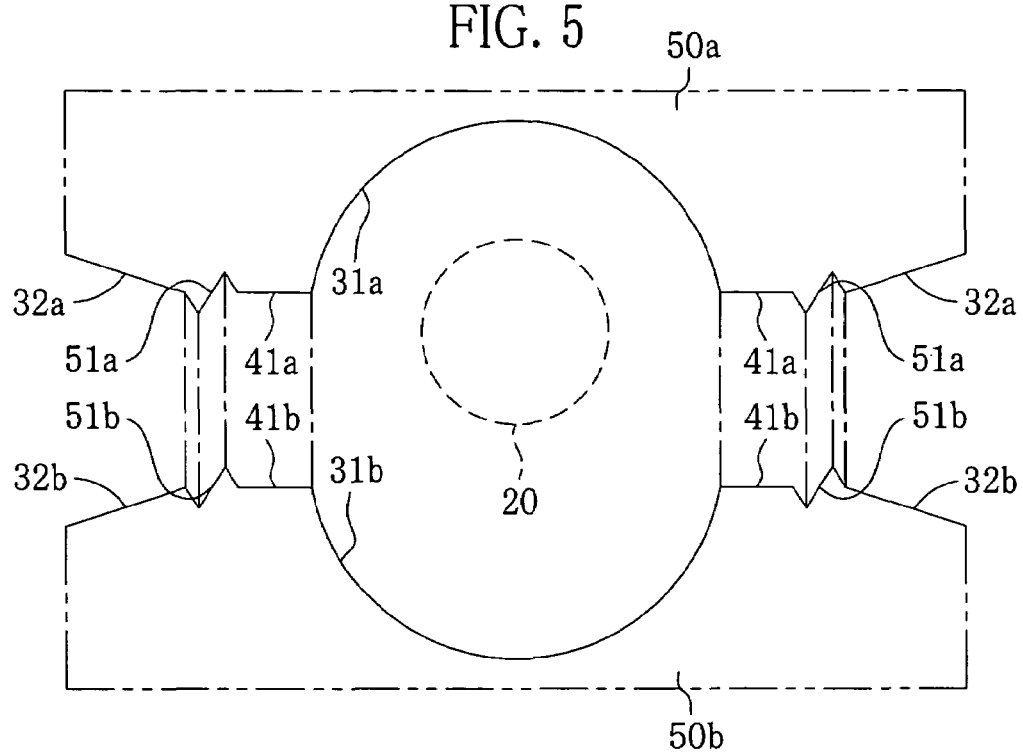
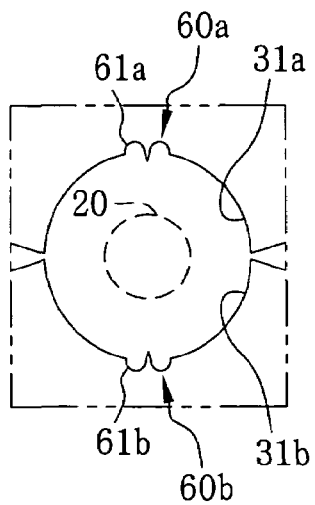
FIG. 6A
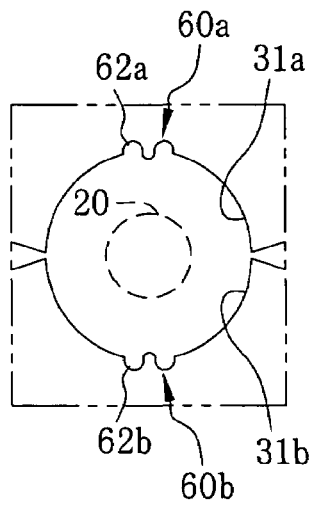
FIG. 6B
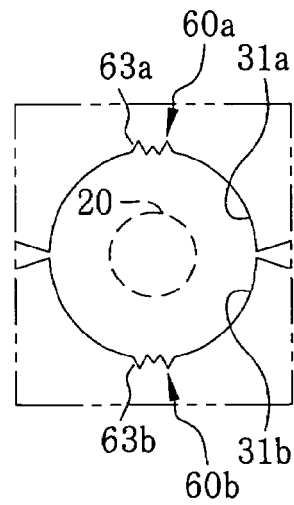
FIG. 6C

SURFACE LIGHT-SOURCE DEVICE AND DISPLAY UNIT USING THE SAME

FIELD OF THE INVENTION

The present invention relates to a surface light-source device capable of performing double-side display, and further relates to a display unit using the same.

BACKGROUND OF THE INVENTION

Various display units of an advertising light, a marker light, an evacuation light and so forth are set up in places of offices, shops, roads, transportation and so forth. Some of the display units are visible from both sides thereof. In the most popular display unit of so-called light box, light sources of fluorescent lamps and so forth are disposed inside a rectangular parallelepiped comprising a transparent plate. Letters and designs drawn on the transparent plate are illuminated by the light source from the inside to perform double-side display.

In the case of the light box, if a distance between the light source and the transparent plate is merely shortened for the purpose of downsizing, irradiation unevenness occurs and it becomes difficult to recognize the letters and the designs. In consideration of this, a light diffusion sheet is attached to the back of the transparent plate to reduce the irradiation unevenness. In virtue of this, it is possible to thin a width from 100 mm or more to about 60 mm. However, there arises a problem in that brightness is lowered due to loss caused by light absorption and reflection of the light diffusion sheet.

In order to solve the above problem, an illumination-light reflective display device is proposed (see Japanese Patent Publication No. 06-100886). In this display device, two thin transparent light guide plates, both surfaces of which are coated with light-guiding transparent resin and one surface of which is roughened and has letters and designs drawn thereon, are attached to each other so as to make the light of the light source enter from the periphery of the attached light guide plates.

However, as to the display device described in the above-noted Publication, the utilized light of the light source is only the light applied to the periphery of the light guide plates and a part of the reflected light. Since the light is inefficiently utilized, it is necessary to brighten the light source for the purpose of obtaining the desired brightness. This causes a problem in that electric power consumption increases. Further, since the brightness of the light source has a limitation, there arises a problem in that a size of the light guide plate is restricted, and consequently, a display size is restricted.

SUMMARY OF THE INVENTION

In view of the foregoing, it is a primary object of the present invention to provide a surface light-source device in which double-side display is performed, a depth is reduced, electric power consumption is decreased and a display size can be enlarged.

It is a second object of the present invention to provide a display unit using the above-mentioned surface light-source device.

In order to achieve the above and other objects, the surface light-source device according to the present invention comprises a rod-shaped light source, first and second light guide members, and a reflector member. The light guide member has an emission surface for emitting the light of the light source as planar light. The reflector member reflects the light of the light source, which has entered the light guide member, toward the emission surface. Each of the first and second light guide members has a rear surface opposite to the emission surface, and a groove for containing the light source is formed in the respective rear surfaces. Incline surface pairs having a V-shaped section are also formed on the rear surfaces. The incline surface pair is symmetrical about a plane which is perpendicular to the emission surface and includes a central axis of the light source. The groove is disposed at a portion which is formed by the incline surface pair so as to be convex relative to the emission surface. The first and second light guide members are disposed such that the rear surfaces thereof closely confront each other so as to interpose the light source between the grooves. The reflector member is disposed in a space formed by the incline surface pairs.

It is preferable that a joint surface extending parallel to the emission surface is formed between the groove and an incline surface composing the incline surface pair.

It is preferable that a first irregularity is formed between the groove and the incline surface for the purpose of scattering the light of the light source, which has entered the light guide member through a joint portion thereof.

It is further preferable that a second irregularity is formed at the deepest portion of the groove for the purpose of scattering the light of the light source, which has entered the light guide member through the deepest portion of the groove.

The display unit of the present invention includes the above-mentioned surface light-source device and utilizes the planar light as backlight.

According to the surface light-source device of the present invention, it is possible to perform double-side display and a depth of the device is reduced. Further, electric power consumption is decreased and a display size can be enlarged.

According to the display unit of the present invention, it is possible to perform double-side display and a depth of the unit is reduced. Further, electric power consumption is decreased and a display size can be enlarged.

BRIEF DESCRIPTION OF THE DRAWINGS

FIG. 5 is an enlarged plan view showing an example in that irregularities having a prism-row shape are formed on the light guide plates; and FIGS. 6A, 6B and 6C are illustrations respectively showing a shape of the deepest portion of a groove containing a light source, wherein FIG. 6A shows the irregularity having curved sections and a V-shaped section, FIG. 6B shows the irregularity having curved sections, and FIG. 6C shows the irregularity having a saw-like shape.

DESCRIPTION OF THE PREFERRED EMBODIMENTS

Figure 1:
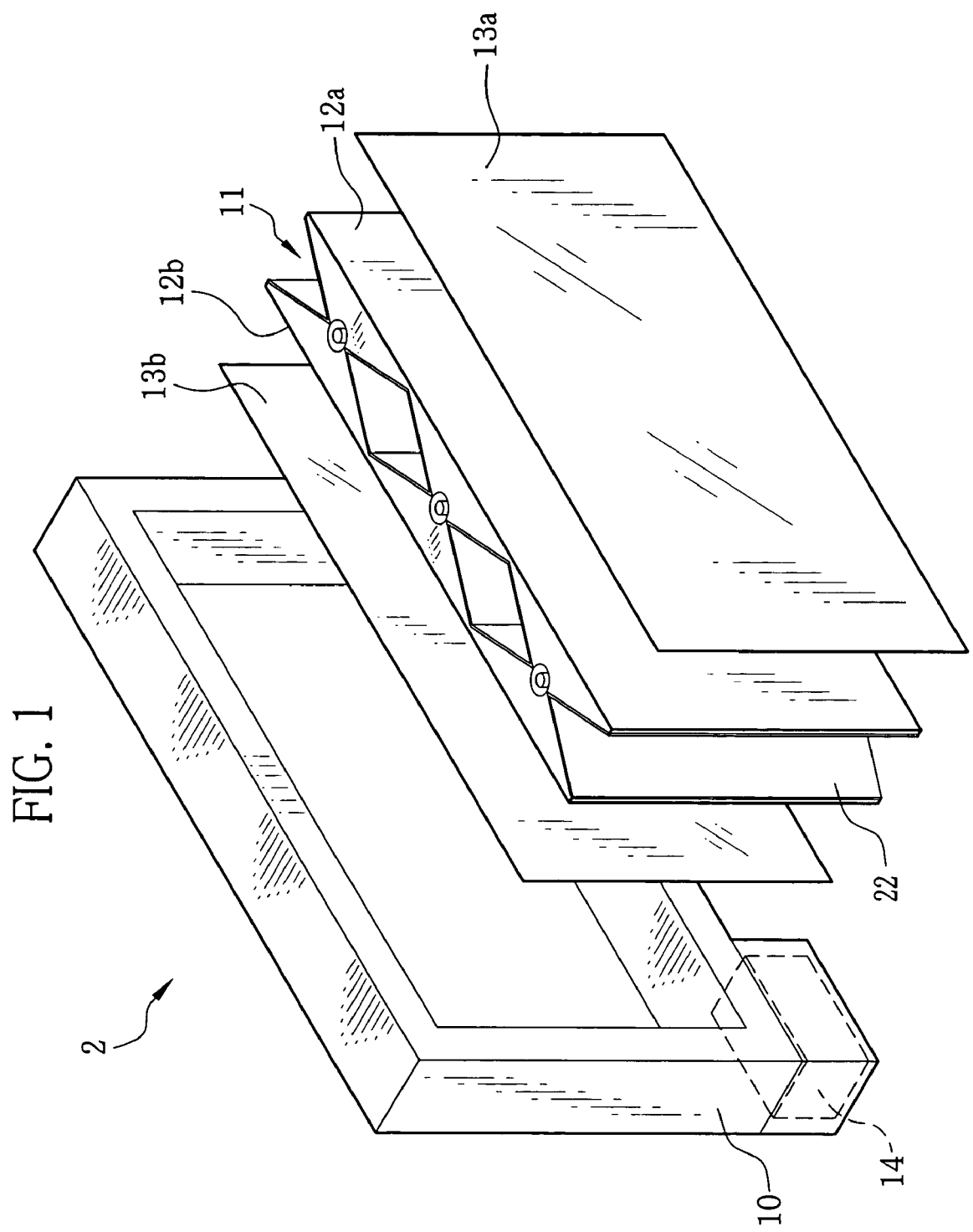
FIG. 1 is an exploded perspective view showing a structure of a display unit.

In FIG. 1, a display unit 2 comprises an outer frame 10, a surface light-source device 11 contained in the outer frame 10, translucent sheets 13a and 13b attached to emission surfaces 12a and 12b of the surface light-source device 11, and a drive unit 14 including an inverter power source and a control circuit. The display unit 2 illuminates letters, designs and so forth, which are drawn on the sheets 13a and 13*b*, by the surface light-source device 11 so that information is adapted to be viewed from both sides. For example, the display unit 2 is used as an advertising light, a marker light, an evacuation light and so forth set up in places of offices, shops, roads, transportation and so forth.

Figure 2:
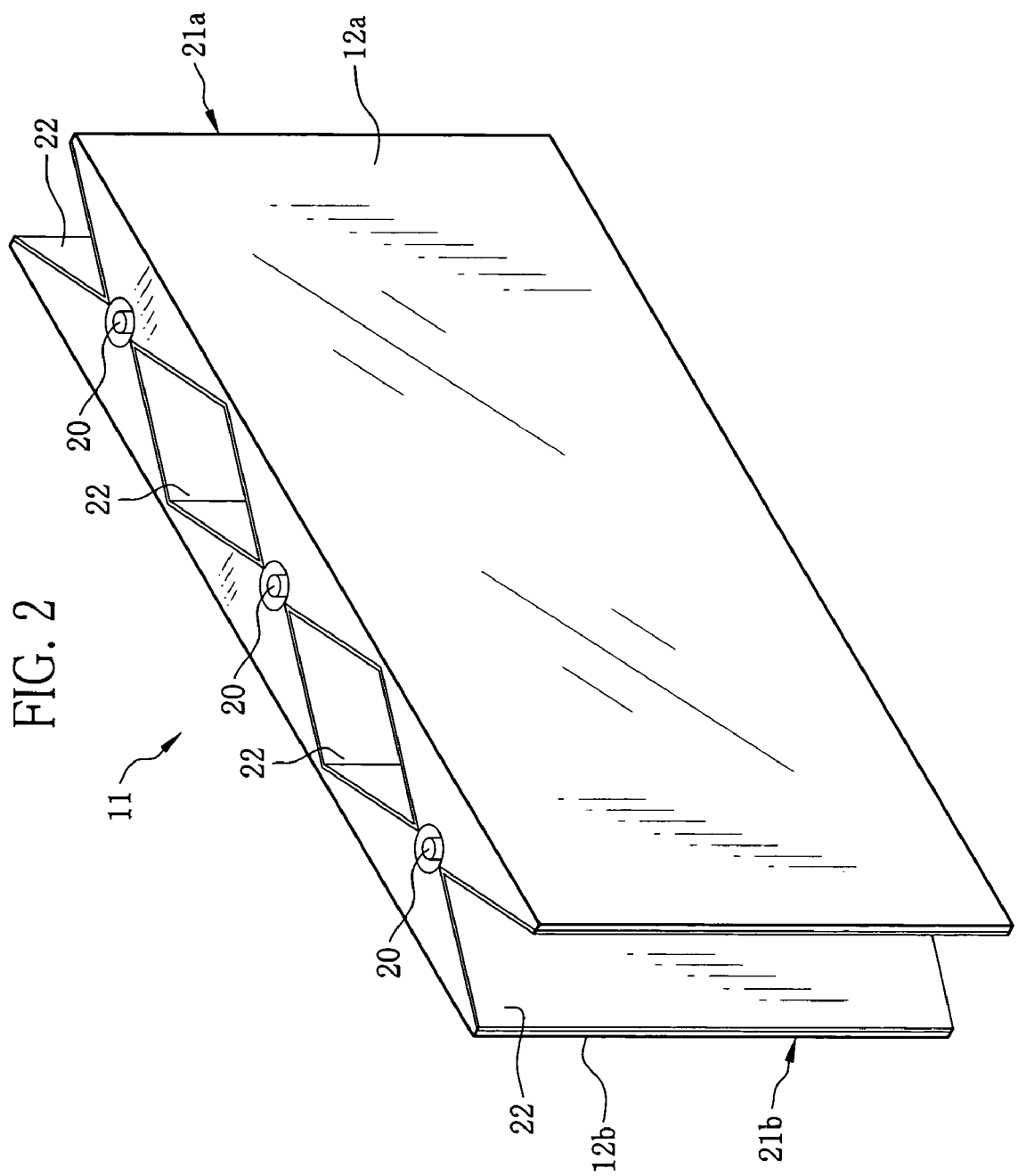
FIG. 2 is a perspective view showing a structure of a surface light-source device.

In FIG. 2, the surface light-source device 11 includes light sources 20, light guide plates 21*a* and 21*b*, and reflector sheets 22. As the light source 20, a rod-shaped fluorescent tube of cold cathode is used, for example. The light source 20 is electrically connected to the drive unit 14 by which operations for turning on and off the light are controlled. The light guide plates 21*a* and 21*b* are made of transparent resin, for example PMMA (polymethyl methacrylate), and are formed by means of extrusion molding. As the reflector sheet 22, is used for example a reflector sheet of a backlight unit of a liquid-crystal display.

Figure 3:
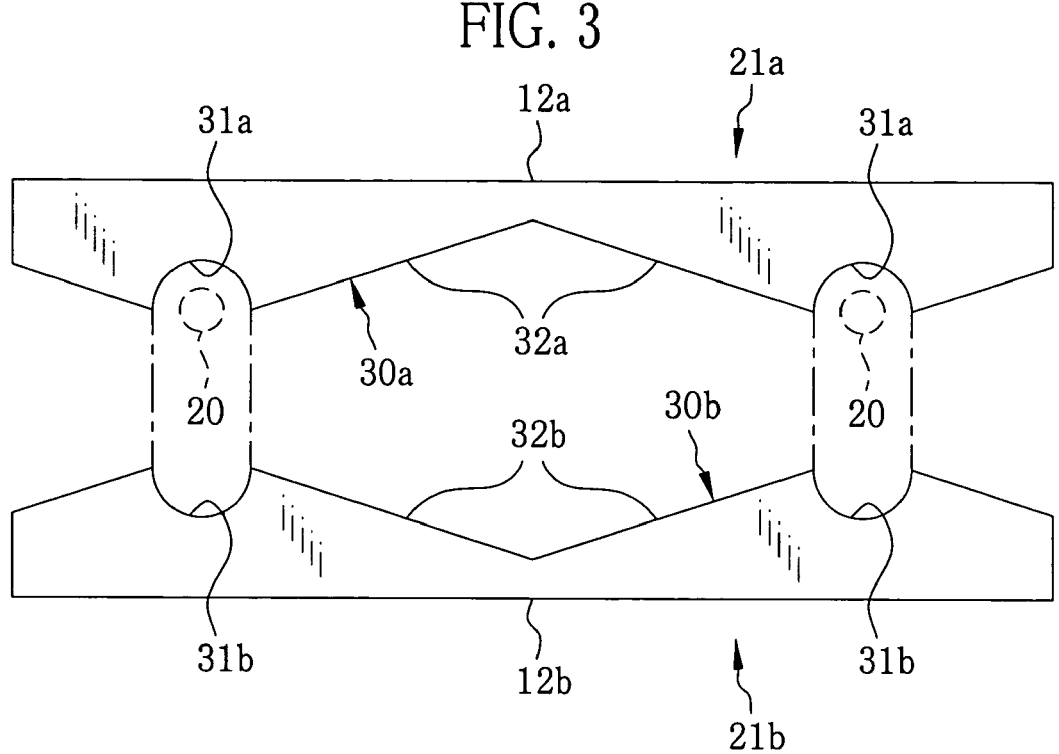
FIG. 3 is an enlarged plan view showing a structure of light guide plates.

As shown in FIG. 3, the light guide plates 21*a* and 21*b* are provided with grooves 31*a* and 31*b* formed in rear surfaces 30*a* and 30*b* opposite to the emission surfaces 12*a* and 12*b*. A section of the respective grooves 31*a* and 31*b* has a semi-elliptic shape, or a partial shape of a hyperbolic curve. Incidentally, the shape of the groove is not limited to the above-mentioned shape and the groove may have a triangular section and a semicircular section.

A space surrounded by the grooves 31*a* and 31*b* contains the light source 20 fixed to a position where a central axis of the light source coincides with a central axis of the space surrounded by the grooves 31*a* and 31*b*. The light source 20 is fixed by heat-resistant silicon adhesive and so forth. The grooves 31*a* and 31*b* are formed so as to prevent the light of the light source 20 from being reflected by the surfaces of the grooves and returning to the light source.

Incline surfaces 32*a* and 32*b* are formed on the rear surfaces 30*a* and 30*b*. The incline surfaces are symmetrical about a plane which is perpendicular to the emission surfaces 12*a*, 12*b* and includes the central axis of the light source 20. Further, the incline surfaces have a V-shaped section such that the grooves 31*a* and 31*b* are formed at convex portions relative to the emission surfaces 12*a* and 12*b*. The light from the light source 20 enters the light guide plates 21*a* and 21*b* through the surfaces forming the grooves 31*a* and 31*b*. The incline surfaces 32*a* and 32*b* reflect the light of the light source 20, which has entered the light guide plates 21*a* and 21*b*, toward the emission surfaces 12*a* and 12*b*. The incline surfaces 32*a* and 32*b* are formed so as to uniformly apply the reflected light to the entire emission surfaces 12*a* and 12*b* for the purpose of reducing irradiation unevenness of the planar light emitted from the emission surfaces 12*a* and 12*b*.

The reflector sheets 22 are attached to the incline surfaces 32*a* and 32*b* (see FIG. 2). The reflector sheets 22 reflect the light, which leaks from the incline surfaces 32*a* and 32*b* to the outside, toward the emission surfaces 12*a* and 12*b*. In virtue of this, the light from the light source 20 is totally reflected inside the light guide plates 21*a* and 21*b*. The totally reflected light is emitted from the emission surfaces 12*a* and 12*b* as the planar light.

With respect to a process for producing the display unit 2, first of all, the light source 20 is fixed inside any one of the grooves 31*a* and 31*b* by the heat-resistant silicon adhesive or the like so as to make the central axis of the light source coincide with the central axis of the space surrounded by the grooves 31*a* and 31*b*. Successively, the light guide plates 21*a* and 21*b* are attached to each other by joining the rear surfaces 30*a* and 30*b* with an adhesive so as to interpose the light source 20 between the grooves 31*a* and 31*b*. And then, the reflector sheets 22 are attached by means of an adhesive so as to cover the incline surfaces 32*a* and 32*b*. In this way, the surface light-source device 11 is produced.

After producing the surface light-source device 11, the drive unit 14 and the light source 20 are electrically connected and the sheets 13*a* and 13*b* are attached to the emission surfaces 12*a* and 12*b*. Finally, the surface light-source device 11 is contained in the outer frame 10 to complete the display unit 2.

Upon turning on the light source 20 by the drive unit 14, the light from the light source 20 enters the light guide plates 21*a* and 21*b* through the surfaces forming the grooves 31*a* and 31*b*. The light having entered the light guide plates 21*a* and 21*b* is reflected by the incline surfaces 32*a*, 32*b* and the reflector sheets 22, and is emitted from the emission surfaces 12*a* and 12*b* as the planar light.

The planar light emitted from the emission surfaces 12*a* and 12*b* uniformly illuminates the entire back sides of the sheets 13*a* and 13*b*. By virtue of this, the letter and the design drawn on the sheets 13*a* and 13*b* are displayed.

As described above, the display unit 2 employs the surface light-source device 11 comprising the light guide plates 21*a*, 21*b* and the reflector sheets 22. At the rear surfaces 30*a* and 30*b* of the light guide plates 21*a* and 21*b*, the grooves and the incline surfaces are formed. The grooves contain the light source 20. The incline surfaces reflect the light of the light source 20 toward the emission surfaces 12*a* and 12*b*. The light guide plates 21*a* and 21*b* are disposed such that the rear surfaces 30*a* and 30*b* thereof closely confront each other. The reflector sheets 22 reflect the light, which leaks from the incline surfaces 32*a* and 32*b* to the outside, toward the emission surfaces 12*a* and 12*b*. The light from the light source 20 is emitted from the emission surfaces 12*a* and 12*b* as the planar light. It is possible to maximally utilize the light of the light source 20, and it is possible to hold down electric power consumption taken for activating the light source 20.

Further, since the grooves 31*a*, 31*b* and the incline surfaces 32*a*, 32*b* are formed so as to restrain the irradiation unevenness of the planar light emitted from the emission surfaces 12*a* and 12*b*, it is possible to reduce the depth of the light guide plates 21*a* and 21*b*. Consequently, it is possible to reduce the depth of the display unit 2.

A size of the emission surface can be enlarged by increasing a number of the light sources. The surface light-source device having the enlarged emission surface is available for a large display size.

Figure 4:
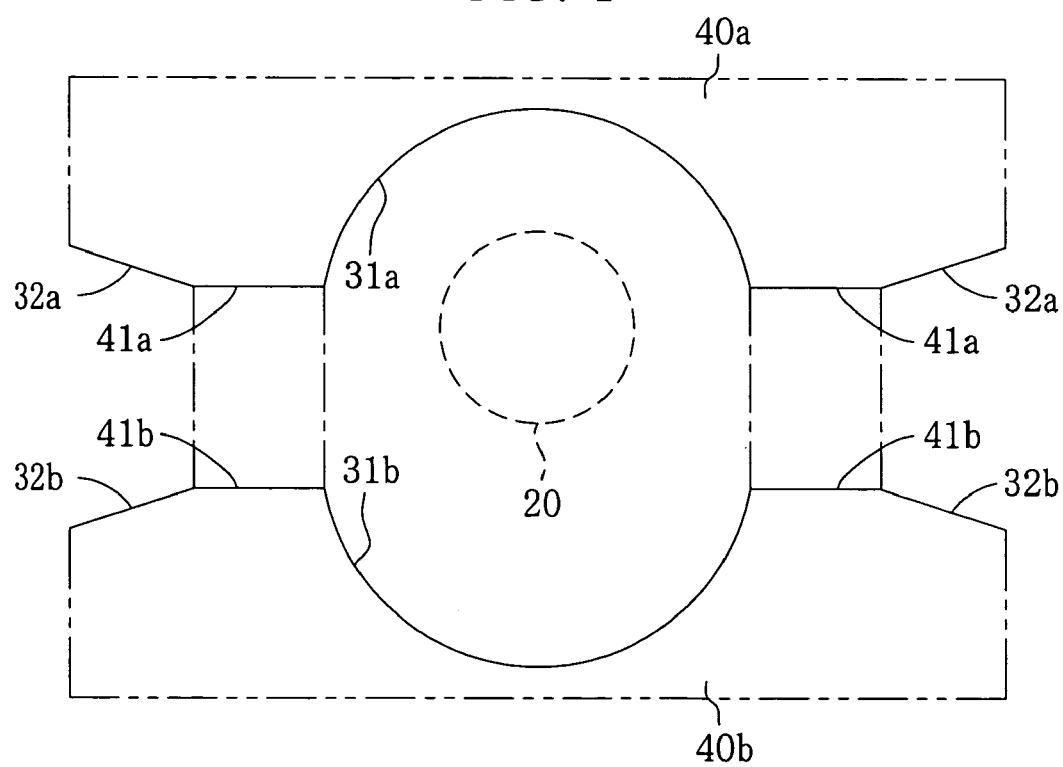
FIG. 4 is an enlarged plan view showing an example in that joint surfaces are formed on the light guide plates.

In the above embodiment, the grooves 31*a*, 31*b* and the incline surfaces 32*a*, 32*b* are formed at the rear surfaces 30*a*, 30*b* of the light guide plates 21*a*, 21*b*. However, light guide plates 40*a* and 40*b* such as shown in FIG. 4 may be used. As to the light guide plates 40*a* and 40*b*, joint surfaces 41*a* and 41*b* extending in parallel to the emission surfaces 12*a* and 12*b* are formed between the grooves 31*a*, 31*b* and the incline surfaces 32*a*, 32*b*. By forming the joint surfaces, it is possible to easily attach the light guide plates to each other. In addition, it is possible to more firmly attach the light guide plates to each other.

Light guide plates 50*a* and 50*b* such as shown in FIG. 5 may be used. As to the light guide plates 50*a* and 50*b*, irregularities 51*a* and 51*b* are formed between the grooves 31*a*, 31*b* and the incline surfaces 32*a*, 32*b*. The irregularities 51*a* and 51*b* are formed in a prism-row shape so that the light from the light source 20 surely enters the insides of the light guide plates 50*a* and 50*b* through the joint portion thereof. Moreover, in virtue of the shapes of the irregularities 51*a* and 51*b*, the light guide plates 50*a* and 50*b* are disposed so as to correctly confront each other. When the light guide plates 50a and 50b are attached to each other, the irregularities 51a and 51b are engaged with each other. The light from the light source 20 is further efficiently used and positioning is easily performed in attaching the light guide plates to each other.

Meanwhile, as shown in FIGS. 6A, 6B and 6C, irregularities 61a and 61b to 63a and 63b may be formed at the deepest portions 60a and 60b of the grooves 31a and 31b for the purpose of effectively scattering the light of the light source 20, which has entered through the deepest portions 60a and 60b, inside the light guide plates. The irregularities 61a and 61b shown in FIG. 6A comprise curved sections and a V-shaped section. The irregularity 62a and 62b shown in FIG. 6B comprise curved sections. The irregularities 63a and 63b shown in FIG. 6C have a saw-like shape. In virtue of the irregularities, it is possible to reduce irradiation unevenness and bright lines to be caused on the emission surfaces 12a and 12b. Incidentally, only one of the concavity and convexity included in the irregularity may be used. The shapes of the irregularities 61a and 61b to 63a and 63b are not limited to FIGS. 6A to 6C.

As to the material of the light guide plate, it is possible to use PC (polycarbonate), PET (polyethylene terephthalate), PP (polypropylene), benzyl methacrylate, MS (methacrylstyrene), COP (cyclo-olefin polymer) and so forth, besides the PMMA used in the foregoing embodiment. As to the producing method for the light guide plates 21a and 21b, it is possible to adopt an injection molding method, a casting polymerization method and so forth. As need arises, fine particles for scattering the light may be mixed in the light guide plate.

As to the reflector sheet, it is possible to use a white resin sheet of which reflectance is improved by forming a void. This void is formed by orientation after mixing filler in the PET, PP and so forth. Besides this sheet, it is possible to use a sheet in which a mirror surface is formed on a transparent sheet or a white resin sheet by aluminum evaporation. Further, it is also possible to use a metal foil of aluminum and so forth, a resin sheet supporting a metal foil, a metal thin plate and so forth.

In the above embodiments, the reflector sheets 22 are attached to the incline surfaces 32a and 32b, and the shapes of the reflector sheets 22 are similar to those of the incline surfaces 32a and 32b. However, the shape of the reflector sheet 22 may be different from that of the incline surface. For example, the reflector sheet 22 may have a cylindrical shape or a semi-elliptic shape. The reflector sheets 22 may be disposed so as to separate from the incline surfaces 32a and 32b without being attached thereto.

The emission surfaces 12a, 12b and the incline surfaces 32a, 32b may be roughened. Alternatively, roughened sheets may be attached to the emission surfaces 12a, 12b and the incline surfaces 32a, 32b.

In the foregoing embodiments, the surface light-source device 11 is loaded into the display unit 2 used as the advertising light, the marker light, the evacuation light and so forth. The present invention, however, is not limited to the above embodiments and may be adopted to a backlight unit of a liquid-crystal display, for example. Moreover, the surface light-source device itself may be utilized as a mere illuminating device.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A surface light-source device comprising:
   a rod-shaped light source;
   a first light guide member having a first emission surface for emitting light of said light source as planar light, said first light guide member having a first rear surface opposite to said first emission surface;
   a second light guide member having a second emission surface for emitting light of said light source as planar light, said second light guide member having a second rear surface opposite to said second emission surface, said first and second light guide members being disposed such that said first and second rear surfaces closely confront each other;
   a first groove formed in said first rear surface;
   a second grove formed in said second rear surface, said light source being contained in a space, which is formed by said first and second grooves, so as to be interposed therein;
   a first incline surface pair formed on said first rear surface, said first incline surface pair being symmetrical about a plane, which includes a central axis of said light source and is perpendicular to said first emission surface, and said first incline surface pair substantially having a V-shaped section wherein said first groove is disposed at a portion which is formed by said first incline surface pair so as to be convex relative to said first emission surface;
   a second incline surface pair formed on said second rear surface, said second incline surface pair being symmetrical about a plane, which includes the central axis of said light source and is perpendicular to said second emission surface, and said second incline surface pair substantially having a V-shaped section wherein said second groove is disposed at a portion which is formed by said second incline surface pair so as to be convex relative to said second emission surface; and
   a reflector member for reflecting the light of said light source, which has entered said first and second light guide members, toward said first and second emission surfaces, said reflector member being disposed in a space formed by said first incline surface pair and said second incline surface pair.

2. The surface light-source device according to claim 1, further comprising:
   a first joint surface formed between said first groove and an incline surface composing said first incline surface pair, said first joint surface being parallel to said first emission surface; and
   a second joint surface formed between said second groove and an incline surface composing said second incline surface pair, said second joint surface being parallel to said second emission surface and being attached to said first joint surface.

3. The surface light-source device according to claim 1, further comprising:
   a first irregularity formed between said first groove and an incline surface composing said first incline surface pair; and
   a second irregularity formed between said second groove and an incline surface composing said second incline surface pair, said first and second irregularities scattering the light of said light source entering through a joint portion of said first and second light guide members.

4. The surface light-source device according to claim 3, wherein said first and second irregularities have an identical shape and engage with each other.

5. The surface light-source device according to claim 4, wherein said first and second irregularities have a prism-row shape.

6. The surface light-source device according to claim 1, further comprising:
a first irregularity formed at the deepest position of said first groove, said first irregularity scattering the light of said light source entering through the deepest position of said first groove; and
a second irregularity formed at the deepest position of said second groove, said second irregularity scattering the light of said light source entering through the deepest position of said second groove.

7. The surface light-source device according to claim 6, wherein each of said first and second irregularities has a curved section and a V-shaped section.

8. The surface light-source device according to claim 6, wherein each of said first and second irregularities has curved sections.

9. The surface light-source device according to claim 6, wherein each of said first and second irregularities has a saw-shaped section.

10. The surface light-source device according to claim 1, wherein said first and second grooves have a semicircular shape.

11. A display unit including the surface light-source device according to claim 1, said display unit utilizing said planer light as backlight.

12. The display unit according to claim 11, further comprising:
a first sheet attached to said first emission surface; and
a second sheet attached to said second emission surface, characters being drawn on said first and second sheets, and the characters being illuminated and displayed by said planer light.

* * * * *